C. W. EBELING.
CONTROL MEANS FOR SOUND REPRODUCING MACHINES.
APPLICATION FILED FEB. 7, 1916. RENEWED DEC. 18, 1917.

1,255,143.

Patented Feb. 5, 1918.

Witnesses
Ed. R. Lusby

Inventor
Charles W. Ebeling
By David P. Moore
Attorney

C. W. EBELING.
CONTROL MEANS FOR SOUND REPRODUCING MACHINES.
APPLICATION FILED FEB. 7, 1916. RENEWED DEC. 18, 1917.

1,255,143. Patented Feb. 5, 1918.

Witnesses
Ed. R. Lusby

Inventor
Charles W. Ebeling
By
Attorney

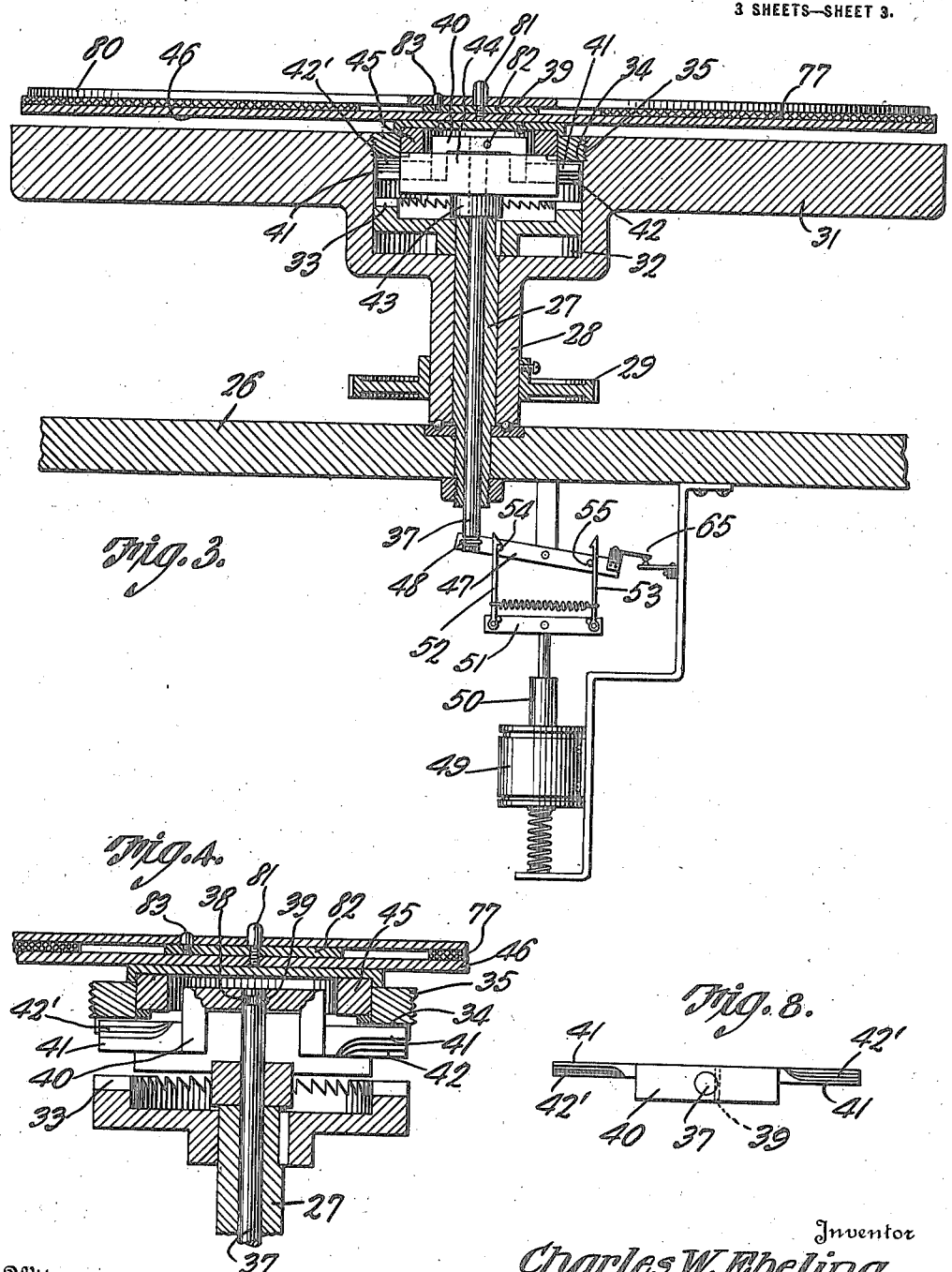

UNITED STATES PATENT OFFICE.

CHARLES W. EBELING, OF NEW YORK, N. Y.

CONTROL MEANS FOR SOUND-REPRODUCING MACHINES.

1,255,143.     Specification of Letters Patent.    Patented Feb. 5, 1918.

Application filed February 7, 1916, Serial No. 76,631. Renewed December 18, 1917. Serial No. 207,798.

*To all whom it may concern:*

Be it known that I, CHARLES W. EBELING, a citizen of the United States, residing at New York, in the county of New York and State of New York, have invented certain new and useful Improvements in Control Means for Sound-Reproducing Machines, of which the following is a specification, reference being had therein to the accompanying drawing.

In combining sound reproducing machines with motion picture mechanisms, there has been the inherent fault that the sound reproducing machine could not be started from an inert position to a full speed, and neither could such mechanism be brought to a stark standstill, to be started from such position again, and so on.

It is therefore the object of the present invention to produce a mechanism, that will start the sound reproducing mechanism from stark standstill to full or maximum speed, and without throwing any strain either upon the sound reproducing mechanism or the motion picture projecting mechanism.

To attain this object, I provide a continuously rotating momentum member, preferably a heavy disk, made in the form of a fly wheel, in combination with a record carrying member, which in turn is connected to and disconnected from the momentum member, so that it will be rotated with the momentum member from a standstill without affecting the speed of such member, it having been discovered that the sound record carried by the record carrying member can be halted in the middle of a word, and again started to continue and finish such word.

The mechanism that forms the connecting link between the record carrying member and the momentum member, consists primarily of two opposed ratchets, one of which is carried by the rotating member and the other of which is stationary, in conjunction with a multiple pawl, which is provided with a plurality of oppositely disposed sets of ratchet engaging portions, whereby the ratchet will have one or more of its teeth engaged without any lost motion between the momentum and record carrying members. This feature makes it possible to stop and start the record with much precision and accuracy.

In order that the invention may be more fully understood and its numerous advantages fully appreciated, attention is invited to the accompanying drawings, in which:—

Fig. 3 is a vertical cross section through the momentum device and the adjacent parts including the tablet support.

Fig. 4 is an enlarged detail sectional view through the momentum member showing the connecting mechanism.

Figs. 5, 6, 7 and 8 are detail views of the pawl and its carrier.

Figure 1:
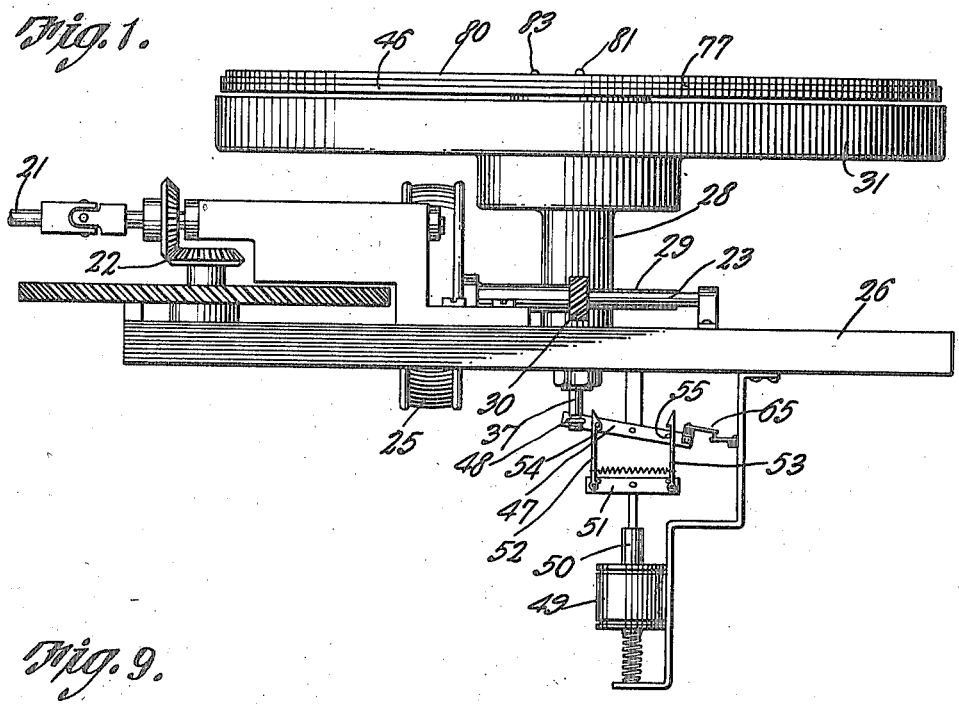
Figure 1 is a front elevation of the sound reproducing means.
Figure 9:
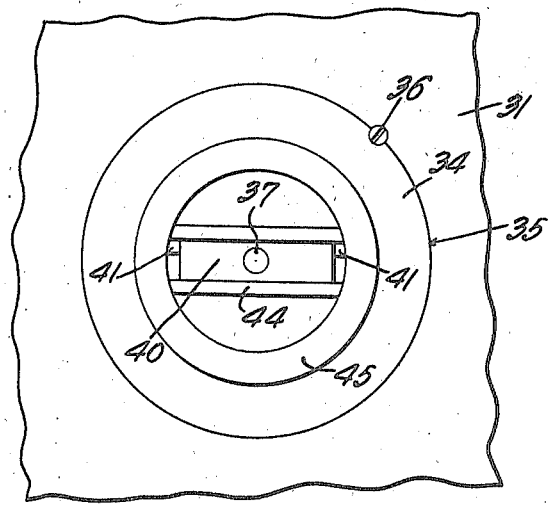
Fig. 9 is a top plan view of the center of the momentum member.
Figure 10:
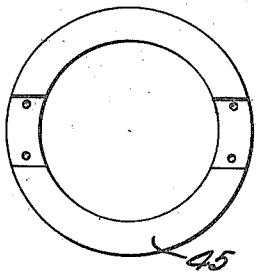
Fig. 10 is a bottom plan view of the annulus carried upon the underside of the record carrying member.
Figure 2:
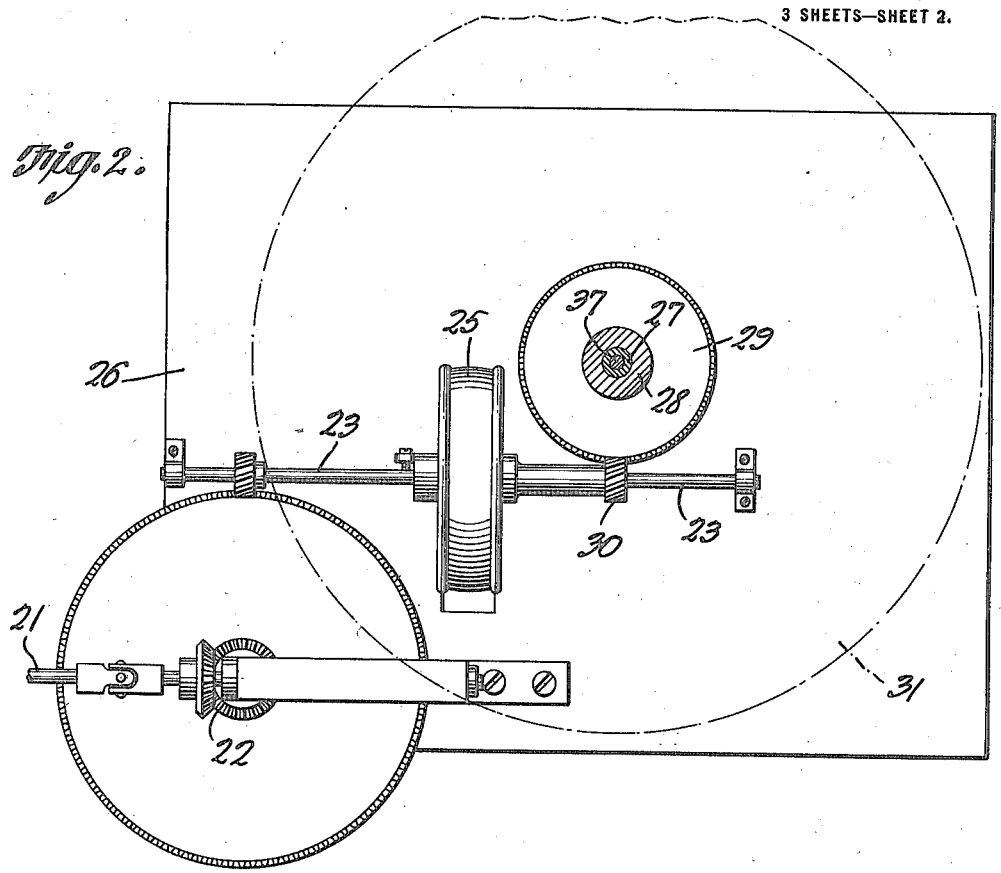
Fig. 2 is a top plan view thereof, the momentum member being removed.
Figure 5:
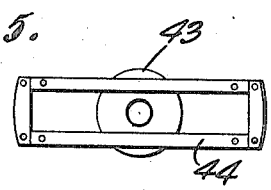
Figure 6:
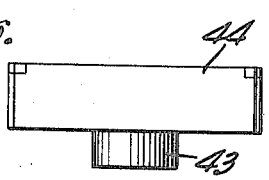
Figure 7:
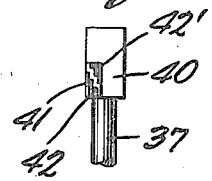

Referring to the drawings, the numeral 21 designates a shaft which is preferably driven from the motion picture projector machine, not shown, to operate in turn through the transmission mechanism 22 the shaft 23, which is made in two sections, with the compensating spring 24 and its housing 25 forming the connection therebetween. A base 26 carries most of this mechanism, and also carries the fixed tubular upright shaft 27, upon which is journaled the sleeve 28, carrying the gear 29, which meshes with the gear 30 of the shaft 23. As the sleeve 28 is formed integral with the momentum member 31, this member is rotated from the motion picture projecting machine, and it is desirable that it be rotated all the time.

A circular chamber 32 is provided in the upper face of the member 31, and the upper end of the shaft 27 projects therein to receive the fixed lower annular ratchet 33, while fitted in the mouth of the chamber is the upper annular ratchet 34, which through the threads 35 and the lock screws 36 is fast to and rotates with the member 31.

Projecting through the shaft 27 and mounted for both longitudinal and rotary movements is a rod 37, the upper end of which is grooved at 38 to receive the locking pin 39, so that the block 40, may be secured thereto for rotary movement, but must move longitudinally with the rod. Carried by this block and extending in opposite directions are the two pawls 41, each one of which is provided with the two oppositely disposed series of teeth engaging projections or steps 42 and 42', the steps 42 being disposed to engage the teeth of the fixed ratchet 33, while the steps 42' are to engage the teeth of the other ratchet 34, only one ratchtet being operated at a time.

The upper end of the rod 37 below the pawl carrying block is projected through the tubular boss 43 of the open frame 44, which in turn houses the block and also the major portion of the pawls, said frame being connected by screws or otherwise to the annulus 45 secured to the underside of the record disk or tablet carrying platform or member 46. Thus the platform or member 46 is always in position to be connected to or disconnected from the member 31. The elevating of the rod 37, moves the pawls into engagement with ratchet 34, and consequently connects the platform 46 with the member 31 through the frame 44, the block 40, the pawls 41 and the ratchet 34. The lowering of the rod 37 causes the pawls to disengage the ratchet 34 and to engage the fixed or stationary ratchet 33, thus halting the block 40, the frame 44 and the platform 46.

As each pawl is provided with the peculiarly formed ratchet teeth engaging ends, each step of which constitutes a tooth engager, it requires a very slight movement of the momentum device to cause the engagement with its ratchet 34 or the ratchet 33, to connect and disconnect the platform 46, without any perceptible lost motion. This special pawl was designed after considerable testing, and was found to accomplish the result desired.

Several mechanisms for imparting the desired longitudinal movement to the rod 37, to control, the operation of the block 40 and the pawls from the motion picture projecting machine, and thus produce the desired synchronism between the two mechanisms when "talking" or "singing" moving pictures are being produced, or where it is desired to introduce verbal explanations of the pictures being projected, as for instance inserts used in the films, may be employed.

One form is here illustrated, and comprises a rocking arm or lever 47, mounted below the base, and operably connected as at 48 to the lower end of the rod 37. The solenoid 49 has its core 50 operably connected to the arm 51, which in turn carries the two pivoted pawls 52 and 53, whose hooked terminals coöperate with the pins 54 and 55, of the arm or lever 47, so that the arm or lever may be rocked and held in such selected position, and thus impart the desired movement to the rod 37 and the pawls, so that the platform 46 will be held inert or connected for rotation with the member 31.

The solenoid 49 is controlled from the film in any desired manner, the detail arrangement and construction of which it is not deemed necessary to show in the present application.

As a telephone system is employed to convey the sound from the record tablet to various points in the auditorium a switch 65 is provided to open and close said circuit at the proper time, the circuit being open when the tablet is inert and closed when the tablet is revolved.

The upper surface of the platform 46 is covered with the usual sheet 77 of soft material to receive the sound record or tablet 80. The centering pin 81 is carried by the platform which has the center disk 82 held thereto by the pin 81 and also the other pin 83, which coöperates in holding the tablet 80 upon the platform 46. This arrangement of pins also assist in placing the record tablet for proper positioning in starting the same, in connection with the phonic groove of the record and the stylus of the transmitter.

What I claim as new is:—

1. In an apparatus of the character described, a continuously rotating driven member having a recess in one face thereof, and also having a clutch member, a stationary locking clutch member mounted in said recess, a driven member, and slidable means connected to the driven member and adapted to be engaged with either one of the clutch members, whereby the driven member is rotated with the driving member or held stationary.

2. In an apparatus of this character, the combination of a support, a continuously rotating member mounted thereon, a slidable member disposed axially of the rotating member, an engaging member carried thereby, a sound record support operably connected to the engaging member, two independent means, one carried by the rotating member and one stationary whereby when one means is engaged by the engaging member the record support is rotated by the rotating member and when the other means is engaged the record support is held stationary, and means for actuating the slidable member to select the position of the engaging member.

3. In an apparatus of this character, the combination of a support, a continuously rotating disk mounted thereon, a rod mounted axially of and for longitudinal sliding movement through the disk, a pawl carried by the rod, a sound record support operably connected to the pawl, two independent means one rotatable with and the other stationary relatively to the disk, whereby when one means is engaged by the engaging member the record support is rotated by the rotating member and when the other means is engaged the record support is held stationary, and means for actuating the rod.

4. In an apparatus of this character, the combination of a support, a continuously rotating disk mounted thereon, a rod mounted axially of and for longitudinal sliding movement relatively to the disk, a pawl carried by the rod, a sound record support operably connected to the pawl, two oppositely disposed ratchets, one carried by the disk and the other stationary, said pawl being disposed for movement between the ratchets, and means for sliding the rod to connect the pawl with the ratchets, whereby the sound record tablet support is connected or disconnected relatively to the rotating disk.

5. In an apparatus of this character, the combination of a support, a continuously rotating disk mounted thereon, a rod mounted axially of and for longitudinal sliding movement relatively to the disk, a member connected to the rod and extending diametrically of the disk, said member being provided upon each end with two series of oppositely acting teeth, two rings, one of which is stationary and the other of which is fast to the disk, the opposed faces of said rings being toothed for coöperation with the teeth of the rod carried member, means for sliding the rod to cause either toothed ring to be engaged by the rod carried member, and a sound record tablet support connected to the rod carried member, whereby the latter is connected to or disconnected from the rotating disk.

6. In an apparatus of this character, the combination of a support, a continuously rotating disk having a concentric chamber, said disk being mounted upon the support, two rings, one made fast to the support and the other carried by the disk, both of said rings being within the chamber and the opposed faces of such rings being clutch faces, a sound record tablet support, a sliding rod mounted in the first support and connected to the record tablet support, a clutch member carried by the rod for engagement with one of the rings at a time, and means for sliding the rod to cause the clutch member to engage either ring at a time and thereby connect or disconnect the tablet support relatively to the rotating disk.

7. In an apparatus of this character, the combination of a support, a continuously rotating disk carried thereby, two rings one made fast to the support and the other carried by the disk, the opposed faces of such rings being clutch faces, a sound record tablet support, a frame carried by the tablet support, a clutch member mounted in said frame for sliding movement, a sliding rod mounted in the first support and connected to said clutch member, and means for sliding the rod to actuate said clutch member relatively to the rings.

8. In an apparatus of this character, the combination of a support, a continuously rotating disk mounted thereon and having a concentric chamber open through the top, two rings, one made fast to the support and the other carried by the disk, both of said rings being within the chamber and the opposed faces of such rings being provided with teeth, a sound record tablet support, a sliding rod mounted in the first support and operably connected to the tablet support, a pawl connected to said rod for engaging the teeth of the respective rings, and means for sliding the rod to actuate the pawl.

9. In an apparatus of this character, the combination of a support, a continuously rotating disk mounted thereon, and having a concentric chamber open through the top, two rings, one made fast to the support and the other carried by the disk, both of said rings being within the concentric chamber and the opposed faces of such rings being provided with teeth, a sound record tablet support, a frame carried by the tablet support and projecting into said chamber, a pawl mounted in said frame for sliding movement, a sliding rod mounted in the first support and connected to said pawl, and means for sliding the rod to move the pawl into engagement with either one of the rings at a time.

10. In an apparatus of this character, the combination of a support, a continuously rotating disk mounted upon the support and having a chamber therein, two rings, one connected to the disk within the chamber and the other connected to the support and also in the chamber, the later being stationary, the opposed faces of the rings being provided with teeth, a sound record tablet support, a rod slidably mounted in the first support and operably connected to the tablet support, means carried by the rod for engaging the teeth of one of the rings at a time, and means for actuating the rod.

11. In an apparatus of this character, the combination of a support, a continuously rotating disk having a concentric chamber therein, two rings, one connected to the disk within the chamber and the other connected to the support within the chamber, the latter being stationary, the opposed faces of the rings being provided with teeth, a sound record tablet support, a frame carried by the tablet support, a pawl mounted in the frame and having its terminals disposed to engage the teeth of the rings, a rod slidably mounted in the first support and connected to the pawl, and means for actuating the rod to cause the pawl to engage one of the rings at a time.

12. A sound reproducing mechanism, including a support, a tubular shaft carried thereby, a disk having a tubular portion and a concentric recess surrounding the tubular shaft for rotation, driving means connected thereto, a pair of oppositely disposed transmission means mounted within the recess of the disk, one being connected to the disk and the other being fast to the tubular shaft, and selectively operated means mounted in the shaft and disposed within the recess for sliding movement, whereby either one of the transmission means is engaged at a time.

13. A sound reproducing mechanism, including a support, a tubular shaft carried thereby, a disk having a tubular portion and a concentric recess surrounding the tubular shaft for rotation, driving means connected thereto, a pair of oppositely disposed transmission means mounted within the recess of the disk, one being connected to the disk and the other being fast to the tubular shaft, selectively operated means mounted in the shaft and disposed within the recess for sliding movement, whereby either one of the transmission means is engaged at a time, a sound record platform disposed above the disk for independent rotation, and means connected thereto and to the selective means, whereby the platform is held inert or rotated with the disk.

14. A sound reproducing machine, including a support, a fixed tubular shaft carried thereby, a momentum disk having a central recess and a tubular portion, said tubular portion being mounted for rotation upon the shaft, driving means connected to the tubular portion, two oppositely disposed ratchet wheels mounted within the recess, one of said wheels being fast to the fixed shaft and the other being fast to the disk, a tablet support mounted above the disk, a connecting member attached to the tablet support and projected within the recess of the disk, a longitudinally movable and rotative shaft mounted in the tubular shaft and projecting above and below the same, and means mounted upon the upper end of said last shaft and operably connected to the attaching member of the tablet support for establishing connection with either one of the ratchet wheels, whereby the tablet support is held inert when engaging the fixed ratchet wheel or is rotated with the momentum disk when engaging the other ratchet wheel.

In testimony whereof I affix my signature.

CHARLES W. EBELING.